UNITED STATES PATENT OFFICE.

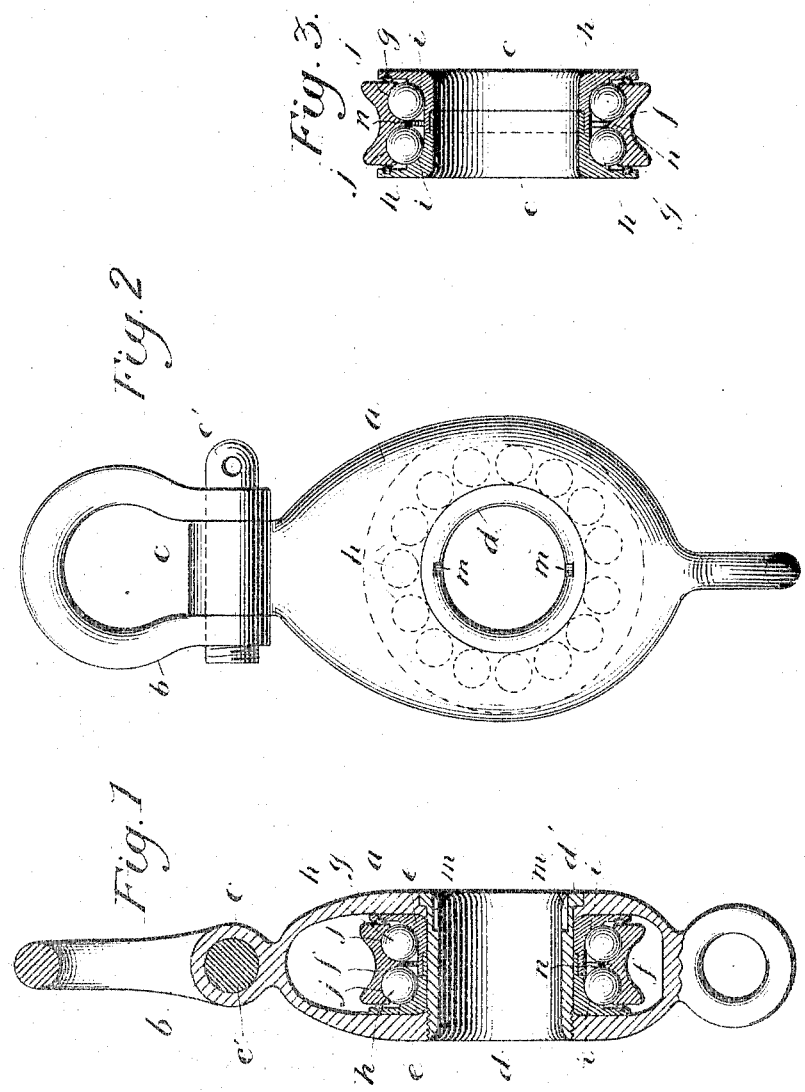

EUGENE E. LA ROSE, OF NEW BEDFORD, MASSACHUSETTS.

BALL-BEARING PULLEY-BLOCK.

No. 817,074. Specification of Letters Patent. Patented April 3, 1906.

Application filed July 3, 1905. Serial No. 268,089.

*To all whom it may concern:*

Be it known that I, EUGENE E. LA ROSE, a citizen of the United States, residing at New Bedford, county of Bristol, State of Massachusetts, have invented certain new and useful Improvements in Ball-Bearing Pulley-Blocks; and I do hereby declare the following to be a full, clear, and exact description of the invention, such as will enable others skilled in the art to which it appertains to make and use the same.

My invention relates to ball-bearing pulley-blocks, and has for its object to provide a simple and efficient pulley-block in which the wear is equally distributed between the sheave-rim and the hub and in which the danger of crushing the balls between the rim and the hub when sudden shocks or heavy pressures are imposed upon the block is practically obviated.

In pulley-blocks provided with antifriction bearings as heretofore constructed much difficulty has been experienced from the uneven wear of the bearing-surfaces on the rim and hub and also from the crushing or rupturing of the antifriction balls or rollers due to sudden shocks or strains incident to the severe use to which these blocks are put, particularly upon shipboard. Either the unequal wear of the bearing parts or the breaking of a single one of the antifriction members is sufficient to put the block out of commission, and most blocks as heretofore constructed were incapable of ready adjustment or repair after they had been disabled, so that in either of the emergencies above noted the block had to be discarded. The evident cause of the unequal wear on the several parts of an antifriction pulley-block is the unequal bearing areas between the same and the inability of the several parts to stand the shocks and strains incident to the work they are required to do, so that the weaker member or that which receives the greatest wear quickly succumbs, with the result that the efficiency of the entire device is destroyed. Furthermore, it has been found that where hard-steel balls have been used as the antifriction members the balls themselves constitute an element of weakness, as in rolling in and out of tension in a rigid raceway having no yield or resiliency one ball of the series is apt to be supporting the entire load at the moment when a sudden shock or a heavy pressure is imposed upon the block sufficient to crush the ball.

The purpose of the present invention is to make the two bearing parts as nearly equal as possible as to their wearing qualities and to provide a sheave that is sufficiently springy or resilient, so that when a sudden shock is brought upon the bearing the sheave will give and not crush the balls. While this is the essential purpose of the invention, the mechanical construction of the pulley-block is such as to allow of ready replacing of any worn or damaged part, so that the device may be quickly repaired or adjusted without entailing the loss and delay incident to the substitution of a new block for the old one.

In the accompanying drawings, Figure 1 is a transverse sectional elevation of a single sheave-block embodying the characteristic features of my invention. Fig. 2 is a side elevation thereof. Fig. 3 is a vertical transverse section through the hub and rim.

Referring to the drawings, $a$ indicates the shell or body portion of the block preferably formed as an integral casting of brass, bronze, or similar metal having the two side plates united at top and bottom and terminating at the top in the usual eye $c$, which receives the pin $c'$, to which the shackle $b$ is swiveled.

The side plates of the shell $a$ are provided with oppositely-disposed openings adapted to receive a relatively large hollow bearing-pin $d$, which is screw-threaded at one end to engage corresponding screw-threads in the hole in the block-face and is provided at its other end with an annular rim or flange adapted to fit snugly within a shouldered recess formed about the edge of the hole in the opposite face of the shell, so that the ends of said bearing-pin lie flush with the side walls of the shell. The pin $d$ has two notches cut in the shouldered end, which permit said pin to be readily removed or inserted by means of a flat piece of metal or spanner which engages said notches. The pin $d$ serves to tie the sides of the block together in the center to prevent the side pieces spreading and also serves as a support for the sheave-bearing hub or seat.

Surrounding the pin $d$ and closely fitting the same is the hub or seat which consists of two annular telescoping sections $e\ e$, provided with upturned flanges lying closely along the inner walls of the shell and provided with raceways $i$ $i$ on their outer faces formed in the angle between the side flanges and the annular base portions. It will be noted that the hub as thus formed is divided circumferentially and that the telescoping members thereof meet to form a practically continuous peripheral surface, so that when the parts are assembled said hub constitutes a rigid bearing for the antifriction-balls. Surrounding the hub is the annular rim $f$, which constitutes the working member of the sheave, said rim preferably being provided with a circumferential groove in its periphery to receive the running rope. The rim $f$ is made of a ductile resilient metal and is preferably formed with a relatively thin radial cross-sectional area for reasons to be hereinafter explained. The inner face of the rim $f$ is provided with raceways $j$, separated by an annular inwardly-projecting flange $n$, which serves to confine a double series of antifriction-balls $h$ between said raceways and the coöperating raceways $i$ in the hub.

It will be noted that the bearing-surface between the balls and the raceways $j$ is considerably larger than the bearing-surface between the said balls and the raceways $i$. Furthermore, the outside raceways $j$ in revolving around the inside raceways $i$ have an effective bearing throughout practically their entire circumference, while the inside raceways $i$ are subjected to pressure only through substantially half of their circumference. This discrepancy is so marked that the traction area of the outer raceways is frequently four times as great as that of the inner raceways, and consequently if the raceways $j$ and $i$ were made of metal of substantially the same hardness the wear on the latter would be four times as great as that on the former. In order to overcome this difficulty and to equalize the wear on the raceways, they are made of a relative hardness in substantial proportion to their traction areas—in other words, if the traction area of raceways $j$ is four times that of raceways $i$ the bearing-surfaces of the latter would be made substantially four times as hard as those of the former, so that the ability of the respective raceways to resist wear is rendered substantially equal.

As has heretofore been observed, no provision has been made in former types of pulley-blocks to distribute pressure due to heavy shocks or strains upon the sheave to the several antifriction members supporting the same, which has usually resulted in crushing or injuring the balls. According to the present plan this difficulty is completely obviated, for, as will be noted, the rim $f$ of the sheave is made relatively thin and is formed of a metal having sufficient ductility and resiliency to permit it to be temporarily deformed under heavy strains or shocks and to spring around the balls and distribute the pressure to each of them should one ball be in position to take the load at the moment of greatest strain. After the strain has been relieved, the resiliency of the rim $f$ causes it to immediately assume its proper annular form and to run smoothly on the balls.

In order to exclude dust and dirt from the working parts of the sheave and to retain a proper lubricating material, such as oil, in the bearings, annular washers $g$ of felt are disposed in suitable grooves on the inside faces of the hub to bear against the lateral edges of the rim $f$, as clearly indicated in Figs. 1 and 3.

It will be noted in addition to the advantageous features hereinbefore set forth that my improved pulley-block involves a construction that is readily assembled or dismembered and that it may be easily adjusted and repaired without loss of time.

In assembling the various parts of the block the two sections of the hub are brought into proximity to the rim $f$, the balls inserted in the raceways, and the two sections of the hub forced together at the telescoping joint, after which the sheave with its hub is inserted between the side walls of the shell $a$ and the bearing-pin $d$ slid through the openings in the side walls and the central opening in the hub and screwed home. In order to replace any injured or worn part, the reverse operation is carried out, and the injured part—as, for example, one or more of the balls, a hub-section, or the rim—is removed and a duplicate part substituted therefor, after which the several parts are reassembled.

While the invention has been described with particular reference to a single sheave-block, it will be obvious that it is equally well adapted to multiple sheave-blocks, and while particular attention has been given to the details of construction in the description it is to be noted that the invention is not to be limited to such details, but is to be accorded such scope as the claims indicate.

Having thus described my invention, what I claim, and desire to secure by Letters Patent, is—

1. A sheave, comprising an annular rim, a hub, and antifriction-balls between the rim and the hub, the bearing-faces of the rim and hub having a relative hardness in substantial inverse proportion to their respective contact-surfaces with the balls, whereby wear on the rim and hub is equalized.

2. A sheave, comprising an annular rim, a hub, each having raceways formed therein, and antifriction-balls in said raceways, the respective raceways having faces of a hardness in substantial inverse proportion to the contact-surfaces of each with the balls, whereby wear on the rim and hub is equalized.

3. A sheave, comprising an annular resilient rim capable of temporary deformation, a hub, and antifriction-balls between the rim and hub, said rim being adapted to yield under shocks or strains to distribute the pressure and prevent the balls being crushed.

4. A sheave, comprising a thin annular grooved rim capable of deformation, a hub, and antifriction-balls between the rim and hub, the resiliency of the rim permitting the latter to yield to distribute the pressure and prevent crushing the balls.

5. A sheave, comprising a grooved annular rim of resilient metal having a raceway on its interior face, a hub having a raceway on its outer face, and antifriction-balls in said raceways, the relative hardness of the rim and hub being inversely proportional to their contact-surfaces with the balls, whereby the wear on the rim and hub is equalized and the rim will yield under shocks and strains to avoid crushing the balls.

6. A pulley-block, comprising a shell or body portion, a transverse bearing-pin, a hub having a circumferential raceway on said pin, an annular resilient rim having a raceway on its interior face, and antifriction-balls in said raceways, said rim being adapted to yield under shocks and strains to relieve the balls from rupturing-pressure.

7. A pulley-block, comprising a shell or body portion, a hollow bearing-pin removably supported in the sides of said shell, a hub formed of telescoping sections mounted on said pin, a resilient rim, raceways formed in said hub and rim, and antifriction-balls between said rim and hub, said rim being adapted to yield under shocks and strains to relieve the balls from rupturing-pressure.

8. A pulley-block, comprising a shell or casing, a relatively large hollow bearing-pin removably supported in the sides of said shell, a circumferentially-divided hub provided with telescoping sections supported on said pin, an annular rim formed of resilient metal and having a relatively thin body portion, raceways in said hub and rim, and antifriction-balls in said raceways, the several parts being so constructed and arranged that the rim will yield under shocks and strains to relieve the balls from rupturing-pressure.

9. A pulley-block, comprising a shell or casing, a bearing-pin removably supported in the sides of said shell, a circumferentially-divided hub provided with telescoping sections supported on said pin, an annular rim formed of resilient metal surrounding said hub, antifricton-balls between said rim and hub, and guard-washers between the hub and rim to exclude foreign material in the bearing-surfaces and to retain lubricant in the bearings.

In testimony whereof I affix my signature in presence of two witnesses.

EUGENE E. LA ROSE.

Witnesses:
 WALTER CLIFFORD,
 ROBERT E. TOWNSEND.